Dec. 8, 1931.  L. D. KAY  1,835,949
DUAL TIRED TRUCK WHEEL
Filed March 24, 1926
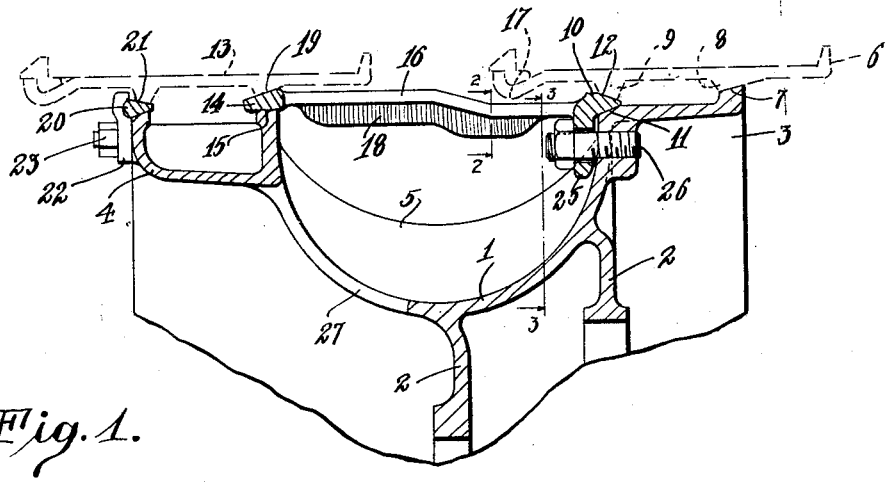
Fig. 1.
Fig. 2.
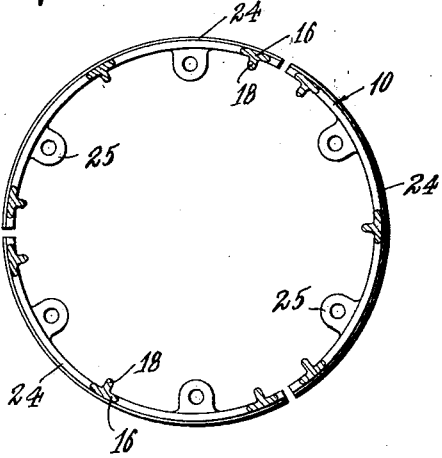
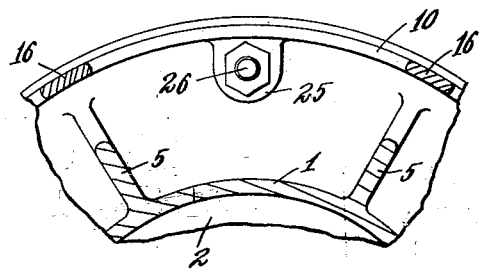
Fig. 3.
Inventor
Lloyd D. Kay.
By Lyon & Lyon
Attorneys.

Patented Dec. 8, 1931

1,835,949

UNITED STATES PATENT OFFICE

LLOYD D. KAY, OF LOS ANGELES, CALIFORNIA, ASSIGNOR TO KAY-BRUNNER STEEL PRODUCTS INC., A CORPORATION

DUAL TIRED TRUCK WHEEL

Application filed March 24, 1926. Serial No. 96,936.

This invention relates to dual-tired automobile wheels and concerns itself especially with means for securing the tire rims to the wheels. An approved type of mounting consists in providing annular ribs on the inner faces of the tire rims which come upon seats on the rim of the wheel, and it has been the custom to pass the inboard tire rim over the wheel from the outboard side, after which the rim is secured in place by a wedge ring. In addition to this it is necessary to provide a seat for the inboard side of the outer tire rim and to secure the same in place.

In the usual construction, there is no provision for circulation of air between the tires, and consequently they tend to become dangerously heated.

The general object of this invention is to provide a simple construction for a wheel of this type and in which the removable seats for the tire rims may be simply constructed and readily secured in place; it is also an object of the invention to provide a construction of rim for the wheel which is particularly adapted to cooperate with the securing means for the rings which carry the rim seats; and to provide means for cooling the tires.

Further objects of the invention will appear hereinafter.

The invention consists in the novel parts and combination of parts to be described hereinafter, all of which contribute to produce an efficient dual-tired truck wheel.

A preferred embodiment of the invention is described in the following specification, while the broad scope of the invention is pointed out in the appended claims.

In the drawings:

Figure 1 is a section through a dual-tired automobile wheel embodying my improvement, the tire rims being indicated in dotted outline.

Figure 2 is a vertical section taken on the line 2—2 of Fig. 1 and extending all around the wheel; this view is upon a reduced scale.

Figure 3 is a vertical section taken on the line 3—3 of Fig. 1 and showing a short portion of the rim of the wheel.

In embodying my invention in an automobile wheel, I prefer to construct the wheel with a concavo-convex or arch shaped rim 1 which is connected integrally to webs 2 which constitute the disc or body of the wheel. This wheel is adapted to be formed of cast iron, but preferably of cast steel. It includes an inboard felloe 3 which connects integrally with the inboard edge of the "arch" 1, and it also includes an outboard felloe 4 which is preferably of "box" form in cross section.

In addition to this the wheel is preferably provided with a plurality of webs 5 disposed in a substantially radial plane and extending across the "bottom" of the "arch" and terminating in the vicinity of the felloes.

In order to carry the inboard tire rim 6, indicated in dotted outline, I provide an inclined tire-rim seat 7 adjacent the inboard edge of the inboard felloe 3. The tire-rim, also is provided with an annular rib 8 on its under side to come upon this seat, and a similar but deeper rib 9 is provided on the under side of the tire rim, which is supported adjacent the outboard edge of the inboard tire. In order to provide a seat for the rib 9 I provide a ring 10 in the form of an annular member with suitable means for securing the same to the inboard felloe adjacent its junction with the "arch" 1. In order to accomplish this I prefer to provide a circumferential seat face 11 which may be of conical shape, and the ring 10 is provided with a conical face on its inner side to seat upon this face 11. On its outer side the ring 10 is provided with a seat 12 in the form of an inclined face which engages the inclined inner face of the rib 9. In this way, the ring 10 cooperates with the seat 7 to carry the inboard tire.

In order to enable the outboard felloe to carry the outboard tire rim 13, I provide a second ring 14 and this ring is in the form of an annular member constructed so as to rest unattached upon a cylindrical circumferential face 15 which is formed on the outer felloe, preferably adjacent its junction with the "arch" 1. This ring need not be secured to the wheel but simply rests on this face. However, in order to hold it in place and absorb lateral thrust forces acting upon it, I connect it with the ring 10. The means which I employ for this purpose may consist of a plurality of transverse bars 16 which are cast integrally with the rings 10 and 14. The ends of the bars 16 adjacent the ring 10 may be slightly depressed or offset downwardly so as to clear the lower edges of the usual downwardly offset flange 17 which is formed on the outboard edge of the tire rim.

In order to stiffen these bars 16, I prefer to form them of T cross section so that each bar presents a vertical web 18 with a flange projecting from it at each side (see Fig. 2).

The outer side of the ring 14 is formed with an inclined seat face 19 which operates as a seat for the corresponding rib on the inner face of the outboard tire rim.

At the outboard edge of the outboard rim, I provide a third ring 20 which is a clamping ring attached to the outboard side of the wheel in any suitable manner and which presents an inclined seat face 21 to cooperate with the face 19 to carry the outboard tire rim 13. This ring 20 may be of the well known wedge form; in other words, for this ring I may use an ordinary wedge ring. This wedge ring 20 is secured in place by lugs or clips 22 secured to the outboard felloe by suitable stud bolts 23.

In order to facilitate placing the rings 10 and 14 in place, I prefer to divide them into a plurality of corresponding sections 24 which are connected at their ends and middle points by the cross bars 16. Each section of the ring 10 may be provided with lugs 25 located between the bars in order to cooperate with stud bolts 26 secured in the outer felloe at its junction with the "arch" 1.

When truck wheels such as this are employed in carrying heavy loads, the tires sometimes become highly heated due largely to the internal friction in the rubber. I prefer to construct the wheel in such a way as to facilitate circulation of air into the space between the tires. Such a circulation is facilitated by the use of the "arch" 1 and also by providing openings 27 through the arch on its outboard side between the disc web 2 and the outboard felloe 4. These openings 27 give access to the studs 26 and also permit air to come into the space enveloped by the "arch" and this air is then forced outwardly by the webs 5 which operate as propeller blades to force the air outwardly between the tires and into contact with the adjacent projecting edges of the tire rims. It will be evident that by employing bars 16 for connecting the rings 10 and 14, this space will be left open so that there is substantially no obstruction to the outward circulation of the air.

In placing the tires on the wheel, the inboard tire rim 6 is of course slid into place and the sections of the ring 10 are then adjusted into position and the nuts of the bolts 26 tightened up. When the ring 10 is put in place, the sections of the ring 14 will come into place on the circumferential face 15 and provide a seat for the outboard rim 13, which is then slid over the outboard felloe; the wedge ring 20 is then put in place and secured.

Special attention is called to the fact that I provide a set of studs mounted in the inboard felloe for securing the inboard split ring of the spacer. The effect of this is that the lateral or side thrust of the tire-rim which is developed in turning curves are reacted to by the seat face 7, which is formed directly on the inboard felloe and by the inboard split ring 10. And I provide a separate set of outboard studs that correspond to the clamping ring 20 and which are mounted in the outboard felloe. In this way the lateral or side thrusts of the outboard rim are reacted to by the clamping ring 20, which is solidly secured to the outboard felloe by its studs, and the lateral or side thrusts of the outboard rim in the other direction are reacted to by the ring 14 imparting the thrusts through the cross bars 16 to the ring 10 which presses against the inboard felloe. I consider this construction far superior to tire-rim mountings in which a spacer ring is employed between the tire-rims held by long bolts that clamp both tire-rims and the spacer up against an inboard seat, for several reasons, one of which is that the long bolts have a greater amount of extension under the great road strains which are developed in driving trucks around curves, thereby tending to loosen up the connection. Such connection should always be clamped up absolutely tight; if there is any movement possible, breakage is almost certain to occur. According to my invention three of the lateral road thrusts are taken solidly on the adjacent portion of the felloe, and the fourth which is developed at the ring 14 is taken through the strut bars 16 solidly against the inboard felloe.

It is understood that the embodiment of the invention described herein is only one of the many embodiments this invention may take, and I do not wish to be limited in the practice of the invention, nor in the claims, to the particular embodiment set forth.

What I claim is:

1. A dual-tired truck wheel having an integral inboard tire-rim seat, an inboard split ring in the form of an annular member with means located at the inboard side of the wheel for securing the same to the wheel, said inboard ring having a seat to cooperate with the first named seat in carrying the inboard tire-rim, and an outboard split ring in the form of an annular member with a plurality of cross-bars integral with the said rings and rigidly connecting the same, said outboard ring constructed to rest upon the wheel at its outboard side and having a seat to cooperate in carrying the outboard tire-rim, said cross-bars being out of contact with the wheel, the openings formed between said cross-bars operating to permit free circulation of the air in the space between the tires, said inboard split ring operating to secure the inboard tire rim independently of the outboard rim.

2. A dual-tired truck wheel having an integral inboard tire-rim seat, an inboard ring in the form of an annular member composed of a plurality of sections, said annular member having means located at the inboard side of the wheel for securing the same to the wheel, said inboard ring having a tapered seat on its radially inner face and a tapered seat on its radially outer side to cooperate with the first named seat in carrying the inboard tire-rim, and an outboard ring in the form of an annular member composed of a plurality of sections to correspond with the first named sections with bars connecting the same integrally with the first named sections, said wheel having a cylindrical circumferential face, the annular member of the outboard ring constructed to rest unattached upon said cylindrical face, and having a tapered seat on its radially outer side to cooperate in carrying the outboard tire-rim.

3. A dual-tired truck wheel having an outboard felloe and an inboard felloe with a concavo-convex wheel rim connecting the same, with the concave side of the rim located radially outward, a ring in the form of an annular member, studs attached to the inboard felloe adjacent its junction with the said rim, said annular member having fastening lugs received on the said studs, said inboard felloe having a tire-rim seat cooperating with said ring to carry the inboard tire-rim, a second ring in the form of an annular member distinct from the first named annular member resting unattached on the outboard felloe adjacent its junction with the said wheel rim, said rings having integral bars connecting the same, said bars lying out of contact with the said concavo-convex wheel rim and bridging the same, said concavo-convex rim having openings in its wall giving access to said studs from the outboard side and permitting free circulation of air in the rim through the spaces between the said bars, said second ring having a seat for the outboard tire-rim.

4. A dual tired truck wheel having a wheel body with an integral outboard felloe and an integral inboard felloe, the inboard felloe having a tire-rim seat adjacent its inboard edge, an annular split spacer ring having an inboard ring, studs mounted in the inboard felloe with nuts located at the inboard felloe for rigidly attaching the inboard ring to the inboard felloe so that the inboard ring cooperates with the inboard rim-seat to carry the inboard tire rim, said spacer ring having an outboard ring resting on the outboard felloe and having bars integral with the inboard and outboard rings and rigidly connecting the same, said outboard ring having a seat for the outboard tire-rim, and a clamping ring seated on the integral outboard felloe, with studs mounted in the outboard felloe for clamping up the same against the outboard tire-rim seat and cooperating with the outboard ring of the spacer to carry the outboard tire-rim.

5. A dual tired truck wheel having a wheel body with an integral outboard felloe, and an integral inboard felloe, the inboard felloe having a tire-rim seat adjacent its inboard edge, a spacer having on inboard split ring, studs mounted in the inboard felloe with nuts adjacent the inboard felloe for attaching the inboard split ring to the inboard felloe, said split ring cooperating with the integral inboard rim-seat to carry the inboard tire-rim, said spacer having an outboard split-ring resting on the outboard felloe and having a seat on its outer side for the outboard tire rim, and an outboard clamping ring seated on the outboard felloe, studs mounted in the outboard felloe, with nuts on the studs for clamping the clamping ring so that the clamping ring cooperates with the outboard ring of the spacer to carry the outboard tire-rim, whereby side thrusts of the inboard rim are reacted to by the inboard felloe and the bolted inboard split ring, and the side thrusts of the outboard tire-rim are reacted to by the outboard tire-rim and the spacer.

6. A dual-tired truck wheel having an integral inboard tire-rim seat, an inboard split ring in the form of an annular member, means carried on the split ring for securing the same to the wheel, bolts located at the inboard side of the wheel cooperating with said means to secure the inboard split ring to the wheel, said split ring having a seat to cooperate with the first-named seat in carrying the inboard tire-rim, and an outboard split ring in the form of an annular member, with a plurality of cross-bars integral with the said rings and rigidly connecting the same, said outboard ring constructed to rest upon the wheel at its outboard side and having a seat to cooperate in carrying the outboard tire-rim, said cross-bars being out of contact with the wheel, the openings formed between said cross-bars operating to permit free circulation of the air in the space between the tires, said inboard split ring operating to secure the inboard tire rim independently of the outboard tire rim.

Signed at Los Angeles, California, this 17th day of March, 1926.

LLOYD D. KAY.